United States Patent [19]
Horton

[11] 3,723,739
[45] Mar. 27, 1973

[54] WATER-COOLED CHOLESTERIC LIQUID CRYSTAL INFRARED IMAGING DEVICE

[75] Inventor: Richard F. Horton, Fredericksburg, Va.

[73] Assignee: The United States of America as represented by the Secretary of the Navy

[22] Filed: June 11, 1971

[21] Appl. No.: 152,306

[52] U.S. Cl.........................250/83.3 H, 250/83.3 HP
[51] Int. Cl.................................................G01t 1/16
[58] Field of Search.........250/83 R, 83.3 H, 83.3 R, 250/83.3 HP

[56] References Cited
UNITED STATES PATENTS

| | | | |
|---|---|---|---|
| 3,410,999 | 11/1968 | Fergason et al.................. | 250/83.3 R |
| 3,569,709 | 3/1971 | Wank.................................. | 250/83 R |
| 3,604,930 | 9/1971 | Allen........................ | 250/83.3 HP X |

Primary Examiner—James W. Lawrence
Assistant Examiner—Davis L. Willis
Attorney—R. S. Sciascia et al.

[57] ABSTRACT

An infrared imaging device for the detection and measurement of hazardous irradiances in a laser beam caused by atmospheric scintillation. The 10.6 micrometer field is displayed visibly through the use of cholesteric liquid crystals on a water-cooled mylar film.

9 Claims, 10 Drawing Figures

INVENTOR.
RICHARD F. HORTON
BY Thomas O. Watson Jr.

ATTORNEY

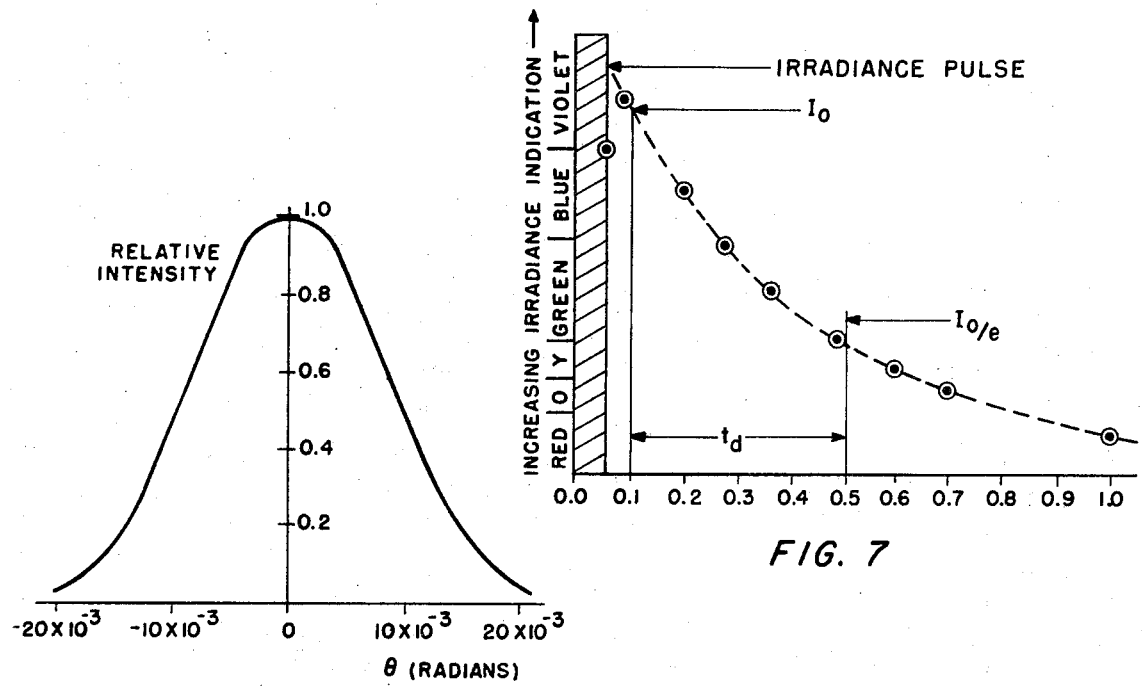
FIG. 7
FIG. 5
FIG. 6
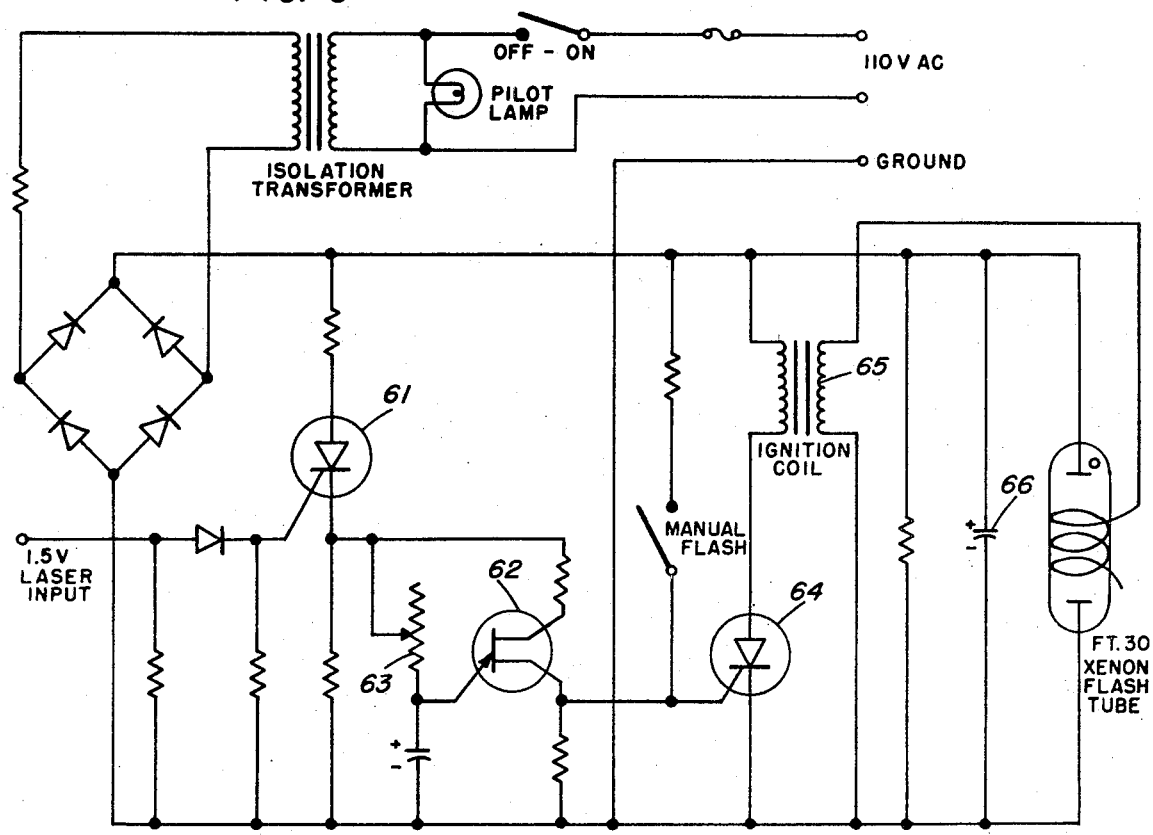

WATER-COOLED CHOLESTERIC LIQUID CRYSTAL INFRARED IMAGING DEVICE

BACKGROUND OF THE INVENTION

1. Field of the Invention

The present invention relates generally to a device for detecting and measuring hazardous irradiances caused by atmospheric scintillation in a propagating $CO_2$ laser beam.

2. Description of the Prior Art

A means of directly observing atmospheric scintillation in a propagating $CO_2$ laser beam is desirable. Information about irradiance fluctuations at this wave length is necessary for safety studies. These fluctuations may produce irradiance levels which are considered unsafe for human exposure. Irradiances greater than 100 $mW/cm^2$ may produce lesions in the skin and cornea.

Atmospheric scintillation is a phenomenon associated with radiation propagating through the atmosphere. Spatial and temporal variations in the index of refraction of the air give rise to random focusing and defocusing of the propagating radiation. This is observed as fluctuations in the irradiance at points within the propagating radiation. The inventive water-cooled, cholesteric liquid crystal, infrared imaging device is capable of observing atmospheric scintillation at a wave length of 10 micrometers.

Liquid crystals are a state of matter characterized by molecular ordering intermediate between the randomness of a liquid and the ordering of a crystalline solid. This is a result of weak intermolecular forces which partially order the large organic molecules. This ordering occurs in small domains. At the same time, the flow and viscosity are typical of liquids. These characteristics are responsible for the name, liquid crystals.

Liquid crystal materials are composed of elongated organic molecules. In the cholesteric state, layers are formed in which the long axis of these molecules are parallel. In each domain, these molecular layers are stacked, one upon another with the molecular axes direction in each succeeding layer rotated some constant amount with respect to the molecular axes direction in the preceeding layer. Thus, along a direction perpendicular to the layers the molecular axes describe a helix as shown in FIG. 1. FIG. 1 illustrates an idealized liquid crystal structure showing helical molecular order. The arrows in FIG. 1 indicate the long axes of molecules.

When the pitch of the helix is equal to the wavelength of light traversing the medium in the direction of the helical axis, the circularly polarized component of this light whose electrical vector rotates with the same sense as the helix, is sharply attenuated and reflected or scattered-back. If white light is incident on liquid crystals, the wavelength of the scattered light is determined by the helical pitch. For a given helical pitch, the liquid crystals appear to be a certain color.

The pitch of the helix of certain cholesterical liquid crystals, and therefore the apparent color, is a strong function of temperature over a range of a few degrees. The liquid crystals used in a specific operating embodiment of the inventive infrared imaging device had a visible color range of about 2° C when illuminated with white light at normal incidence. At 24° C, the liquid crystals first begin to show red coloring. Below 24° C, visible light was not scattered and the liquid crystals were colorless. Violet light was scattered when the temperature was 26° C. Temperatures above 26° C caused the liquid crystals again to be colorless.

Cholesteric liquid crystals have been used in the past to display infrared fields. In each case, the infrared radiation was absorbed causing a temperature rise which was visibly displayed by the colors of the liquid crystals. The temperature rise was assumed to be proportional to the irradiance, so that colors displayed corresponded to the irradiances of the field.

SUMMARY OF THE INVENTION INVENTION

The inventive device provides a new means for obtaining information about irradiance fluctuations caused by atmospheric scintillation in a propagating $CO_2$ laser beam. The device makes use of liquid crystals applied to a mylar film to enable visual observation and measurement of the hazardous irradiances. The device further includes a cooling-water reservoir to provide sufficient cooling-water to permit extended operation at high power average irradiances.

OBJECTS OF THE INVENTION

The main object of the present invention is the provision of means for detecting and measuring hazardous irradiances produced by $CO_2$ lasers.

Other objects, advantages and novel features of the present invention will become apparent from the following detailed description of the invention and considered in conjunction with the accompanying drawings.

BRIEF DESCRIPTION OF THE DRAWINGS

FIG. 5 is a plot of the angular beam profile at 3.0 meters from focus.

FIG. 6 is a circuit diagram of the delay and strobe unit utilized in the circuit of FIG. 4.

FIG. 7 is a graph showing the color response of the inventive detector in response to the center of the Gaussian beam pulse.

DETAILED DESCRIPTION OF THE PREFERRED EMBODIMENT

Figure 1:
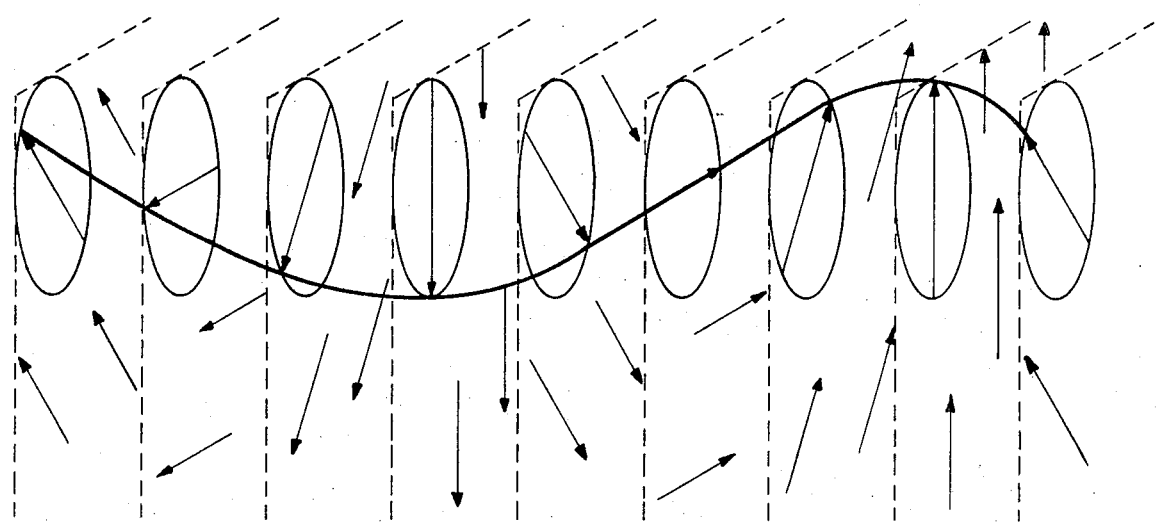
FIG. 1 is an illustration of an idealized liquid crystal structure showing helical molecular order.
Figure 2:
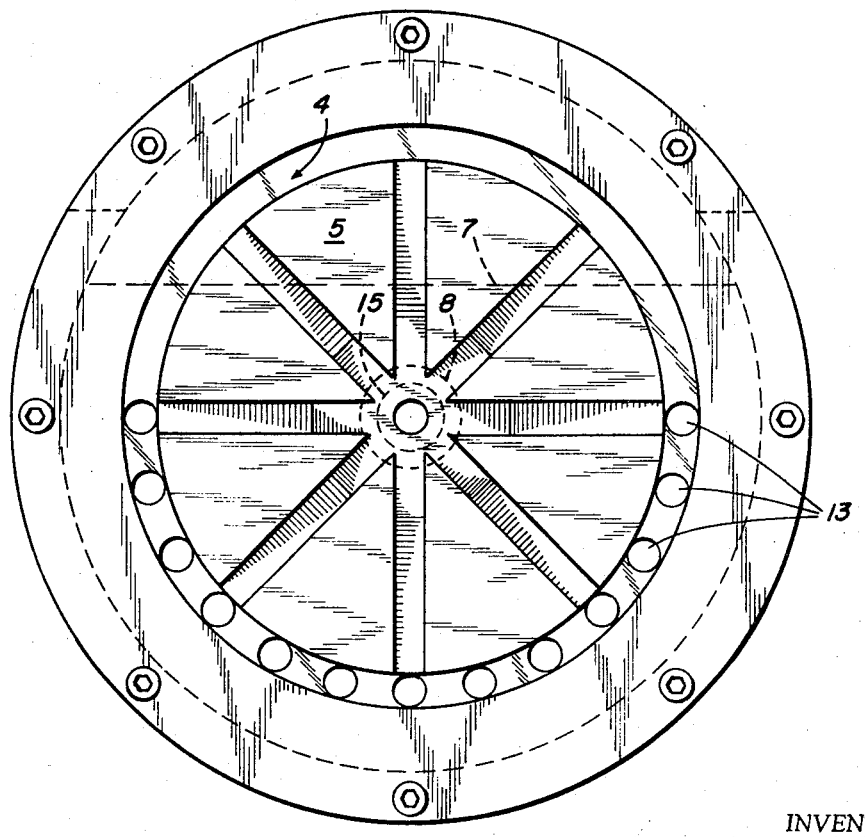
FIG. 2 is a front view of a preferred embodiment of the instant invention.
Figure 3:
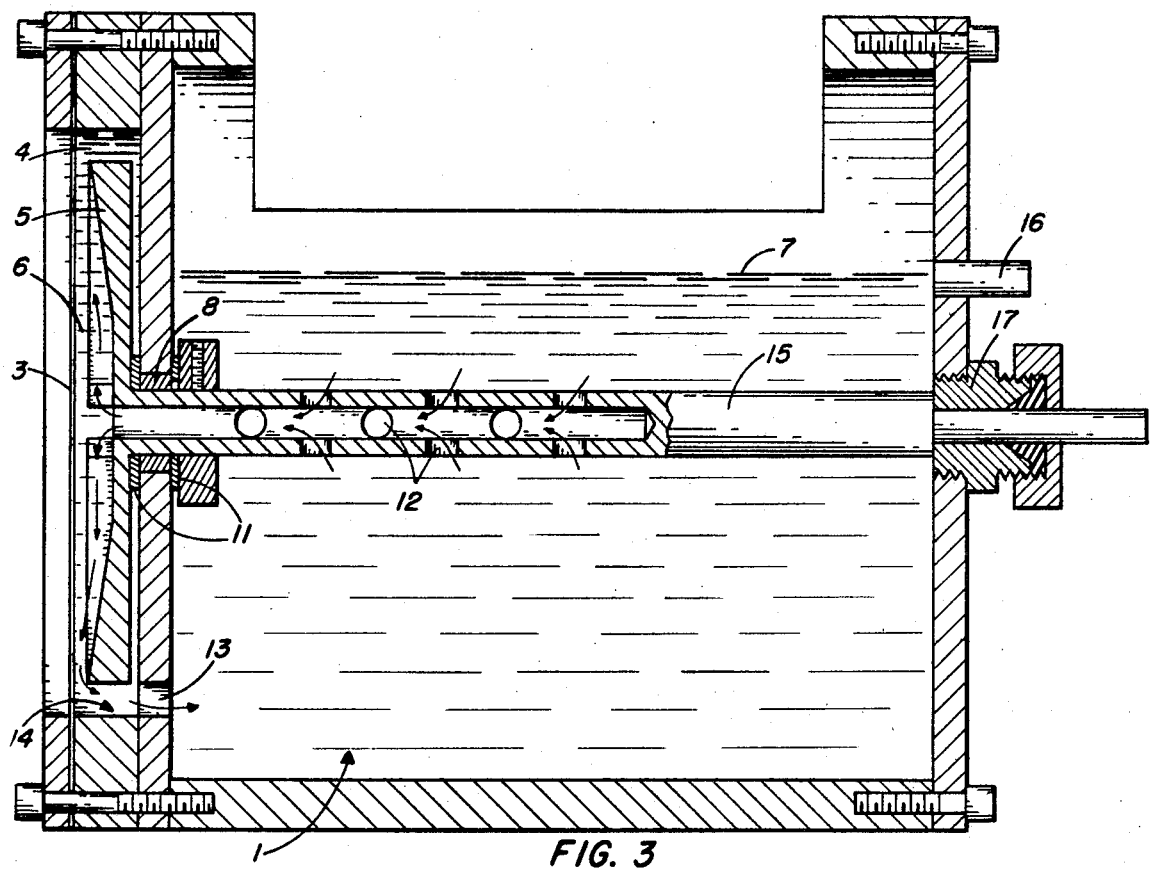
FIG. 3 is a side view of a preferred embodiment of the instant invention.

FIG. 2 is a front view of a preferred embodiment of the instant invention with the mylar film 3 (FIG. 3) removed so that the impellor cavity 14 may be observed. The impellor 5 revolves in the impellor cavity 14 (FIG. 3). Holes 16 provide outlets for the cooling-water.

FIG. 3 is a side view of a preferred embodiment of the inventive imaging device. The major portion of the device is the cooling-water reservoir 1 which provides sufficient cooling-water to allow several minutes operation at very high power/area average irradiances. The drive shaft 15 connects the drive unit to the impellor 5 in the impellor cavity 14. Any suitable drive unit may be used, for example, a small motor may be coupled to the drive shaft 15 through a reduction pulley system. The impellor cavity 14 is formed between the front wall of the water reservoir 1 and the mylar film 3. The distance between the mylar film 3 and the impellor 5 may be varied by changing the thrust washers 11 between the impellor 5 and the front wall of the water reservoir 1.

Water drawn from the reservoir moves through the center of the shaft through the water inlets 12 into the impellor cavity 14 where it is accellerated radially outward between the impellor 5 and the mylar film 3. Besides acting as a mechanism moving a bulk of water, impellor 5 acts to provide a turbulance region 6 at the back side of the mylar film 3 which expedites heat transfer. Water returns to the reservoir through holes 13 in the wall at the outer radius of the impellor. The holes 13 are only in the lower half of the impellor cavity 14 so that a water head 4 may be maintained in the upper half of the impellor cavity. The water level in the water reservoir 7 should be maintained at a sufficient level to provide an adequate supply of cooling-water by the device. A front bearing 8 is provided between the drive shaft 15 and the front wall of the water reservoir 1. Further, a rear bearing and seal 17 is provided between the rear wall of the water reservoir 1 and the drive shaft 15.

Several different thicknesses of mylar film may be used. The thicknesses used in a prototype of the invention ranged in size from 0.5 to 5 mils. The mylar film which worked most satisfactorily had a thickness of 3 mils. The mylar film was heated after insertion in the device. This caused the film to become taut, providing a more workable surface.

A reflective coating of aluminum was deposited on the back surface of the mylar film to prevent infrared radiation, which was not absorbed by the film, from being transmitted to the water. Absorption of this radiation by the water would cause unwanted elevation of the water temperature. The reflected radiation could be further absorbed by the mylar film. The liquid crystals should be applied to the mylar film when the water temperature is around 40° C. This facilitates the evaporation of the solvent used with the cholesteric liquid crystals. After the water temperature was lowered to the operating region, from 24° to 26° C, the liquid crystals should be brushed lightly with a camel's hair brush. This increases the brilliance of the colors displayed by the liquid crystals.

Figure 4:
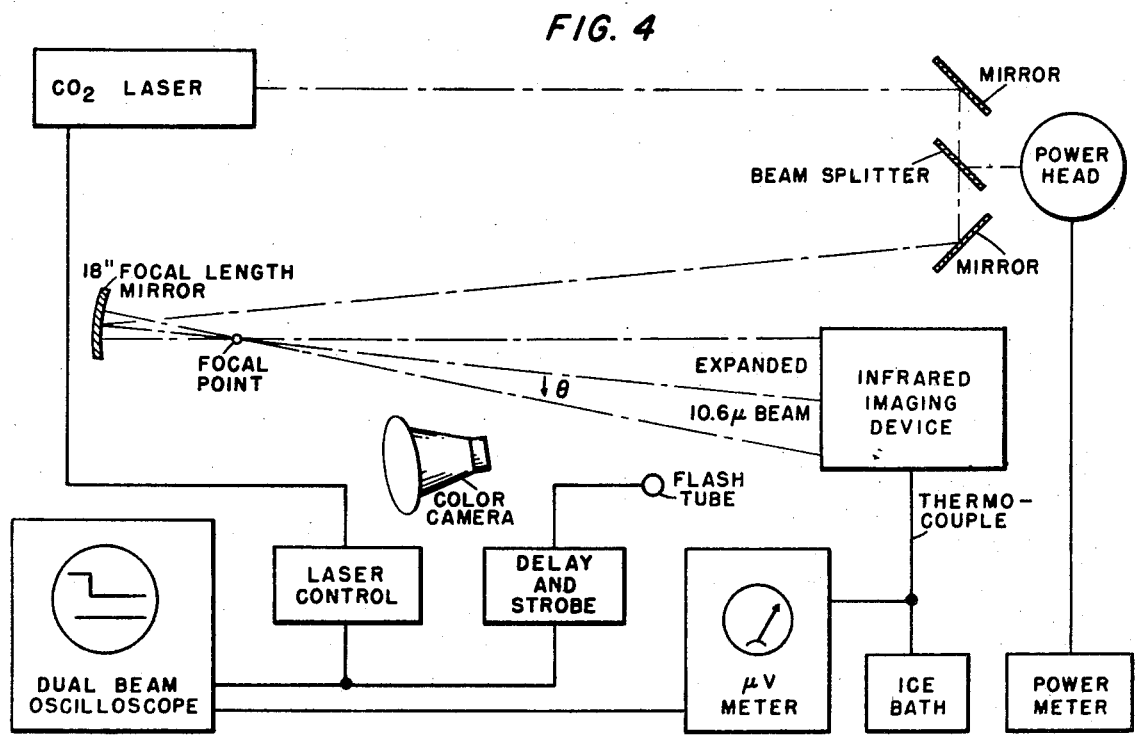
FIG. 4 is a schematic diagram of a laboratory setup used to determine the time constant, the resolution and the operating range of the inventive imaging device.

FIG. 4 illustrates a laboratory setup that was used to determine the time constant, resolution and operating range of a specific operating embodiment of the inventive imaging device. A $CO_2$ laser was used to provide the 10 micrometer infrared radiation. It produced an approximately Gaussian shaped beam ($TEM_{00}$ mode) of 25 watts continuous power or a similarly intense long-pulsed beam of 1/20 of a second duration. The laser's beam current, which provides the plasma with power for lasing, was monitored and displayed on the oscilloscope. The beam splitter and the power meter were used to monitor output power of the laser. An 18 inch focal length mirror was used to expand the beam providing irradiances in the $100mW/cm^2$ region. The CW beam profile was measured with a thermopile detector. The relative profile of the beam is shown in FIG. 5. The angular measurement of FIG. 5 is shown pictorially in FIG. 4.

The cooling-water temperature of the imaging device was monitored with a copper:constantan thermocouple and a microvolt meter. The reference junction of the thermocouple was placed in an ice bath. The temperature of the cooling-water was monitored over a 1.5° C interval and could be adjusted to a desired value with an estimated error of ±0.05° C through the addition of suitable amounts of hot or cold water. The thermocouple was compared with an alcohol thermometer at the limits of this 1.5° C range. During the operation of the device, the output signal of the temperature monitor was displayed on one channel of the oscilloscope. The beam current of the laser was displayed on the other channel. An oscilloscope camera was used to record this data.

An additional oscilloscope camera was used for photographing the color response of the liquid crystals, using Polaroid color film. Variations of the color films' response was minimized by using rolls of film from the same package and closely following the manufacturers recommended development times and by maintaining the angles of illumination and observation fixed.

The delay and strobe unit was used in determining the time constant of the device. This unit was used with a laser pulse rate of 1 per second and with a pulse duration of 1/20 second. The delay and strobe circuits started a timer upon sensing the laser pulse. The delay fired the strobe after a predetermined interval of from 0.05 to 1.0 seconds. The strobe illuminated the liquid crystals so that momentary color response could be photographed. The firing of the strobe appeared in the oscilloscope trace of the beam current. Delay times were measurable from this photographic record. A circuit diagram of the delay and strobe units used is shown in FIG. 6.

The delay and strobe unit was designed to facilitate the data taking by the experimental measurement of the time constant of a liquid crystal imaging device. The circuit was designed to accept a signal from the laser, initiate the timer and finally fire the strobe. A signal of 1.5 volts is sensed from the beam current monitor of the laser by the silicon controlled rectifier 61, allowing current to flow into the timing circuit. The timing circuit is based upon the characteristics of the unijunction transistor 62. After the appropriate time interval, determined by the variable resistor 63, typically a 0–1 megohm variable resistor, the timing circuit fires the silicon controlled rectifier 64. When this fires, the induced high voltage in the secondary of the automotive ignition coil 65 ionizes the FT30 flash tube and the energy in the capacitor 66, typically a 125 microfarad capacitor, is discharged through the flash tube. The ringing of the circuit reverse biases both SCR's, returning them to the nonconductive state. A typical repetition rate of 1 Hz is sufficient to allow recharging of the capacitor 66. The light output of the flash tube was such that for a 1 foot distance between the lamp and the device, Polaroid color film (ASA 75) was shot at f/2.

Any radiation detecting device takes some period of time to respond to a change in the irradiance which it measures. The time constant is a measure of this time period. Typically, the dynamic response of detectors to a step function in irradiance can be approximated by a single exponent of the form $[1 - \exp(-T/t)]$ in which T is the time and $t$ is the time constant.

Figure 8:
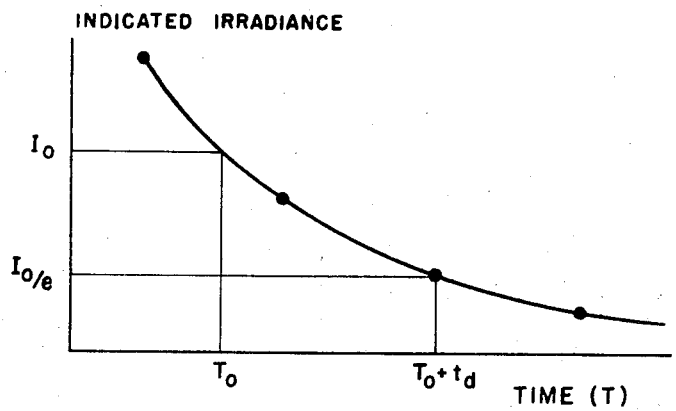
FIG. 8 is a graph showing the decay of the indicated irradiance with time.
Figure 9:
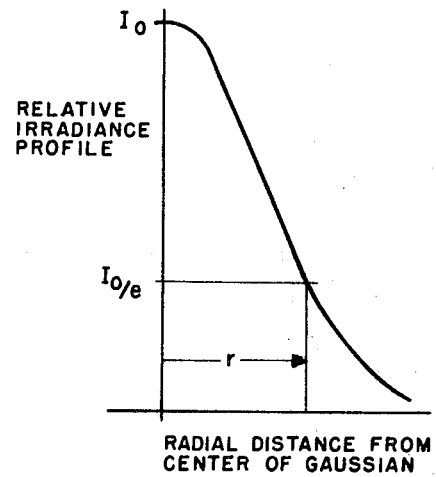
FIG. 9 is a plot of a relative irradiance of the beam versus the radial distance from the center of the beam, showing the radius ($r$) corresponding to $I_o/e$.

The response of the water-cooled, liquid crystal imaging detector is believed to be best described by two time constants, $t_i$ for an increasing step in irradiance and $t_d$ for a decreasing step in irradiance. It is reasonable that $t_d$ is greater than $t_i$. If the rate of cooling were greater than the rate of heating, no temperature rise could be developed. Furthermore, the heat is produced by absorption through the mylar, while the heat is lost to the water by conduction, the slower process of the two. It is assumed that the conduction is the dominant heat loss process. The dynamic response of the device is limited by the largest time constant, $t_d$. $t_d$ was deduced from pictures taken of the color response to an approximately Gaussian shaped beam of 1/20 second duration. The pictures were taken using the delay and strobe unit mentioned previously. The colors of the detector in response to the center of the beam are plotted in FIG. 7. It should be noted that the indicated irradiance is rising even after 0.05 seconds when the pulse stopped. The peak of the indicated irradiance occurred at 0.1 seconds. It is assumed that the decay is independent of the means by which the device is caused to indicate an irradiance, provided this means has not degraded the performance of the apparatus. If this decay is exponential, the color of the detector at 0.1 seconds + $t_d$ indicates an irradiance which is a factor of $1/e$ times the irradiance indicated at 0.1 seconds, as illustrated in FIG. 8. Let the violet color at T = 0.1 seconds correspond to a indicated irradiance of $I_0$ at the center of the beam. The radial distance corresponding to a relative irradiance of $1/e$ was found from the plot of the beam shape, FIG. 9. Using this radial distance, the color corresponding to an indicated irradiance of $I_0/e$ was found from a photograph taken of the device at $t+0.1$. FIG. 7 indicated the color occurred in the decay process at 0.5 seconds. The interval corresponding to $t_d$ is 0.4 seconds. The error due to uncertainties in color differentiation is estimated to be ± 0.1 seconds.

The resolution of an imaging device is directly related to the ability to resolve changes in irradiances which occur over very small distances at the imaging surface. Usually, an alternating pattern of irradiance is used to determine this resolution. When the device being tested can just show the alternating pattern, the spacial frequency of the pattern is quoted as resolution, typically in line pairs per millimeter.

The resolution of the inventive device was determined in a novel fashion. A Fresnel diffraction pattern was used to provide fringes of alternating irradiances. The Fresnel diffraction pattern was produced by a needle placed between the focus of the mirror and the detector. The distance from the center of the diffraction pattern to the point at which the pattern could just be resolved was measured. From optical and geometric considerations, the spacing of the lines in the pattern at this point was calculated. This spacing is taken as the resolution of the device. The calculated value was 3.2 line pairs per millimeter.

Figure 10:
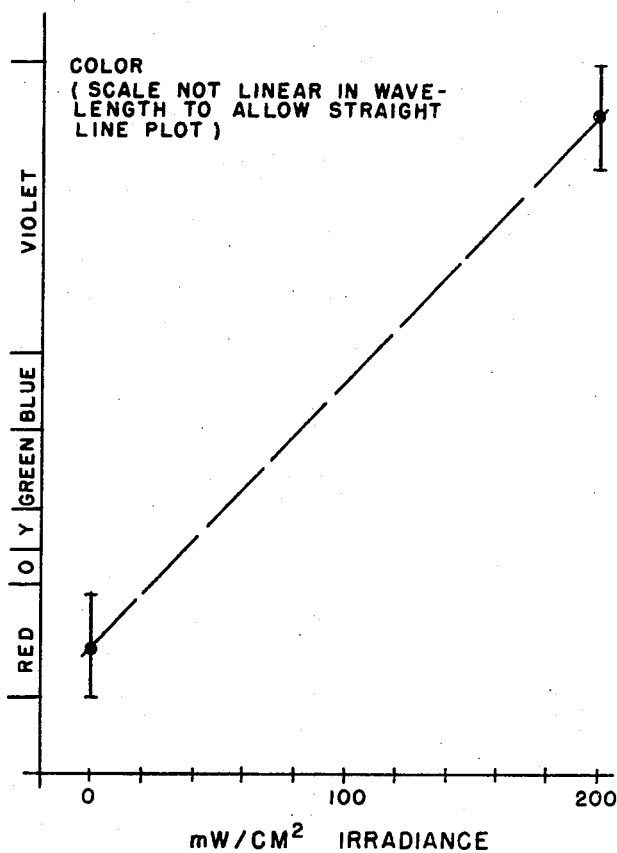
FIG. 10 is a graph showing the color response of the inventive imaging device versus irradiance.

The inventive liquid crystal imaging device can display 10 micrometer radiation over only a particular range of irradiances. This range is determined by the maximum irradiance which can be displayed and the minimum irradiance which can be detected. When the prototype imaging device was thermally biased to just begin red coloring with no infrared field, a violet color was produced at a constant irradiance of 200mW/cm². If the temperature of the mylar film is assumed to be linear with respect to irradiance, the graph depicted in FIG. 10 describes the response of the device. A minimum observable signal would correspond to a minimum observable change of colors. Since this is clearly a subjective value, it can only be estimated at 20mW/cm²

Obviously, many modification and variations of the present invention are possible in light of the above teachings. For instance, since the most outstanding characteristic of the inventive imaging device is its resolution, this suggest several applications including infrared holography, diffraction studies and the testing of infrared optical system resolution. It is therefore to be understood that, within the scope of the appended claims, the invention may be practiced otherwise than as specifically described.

What is claimed is:

1. An infrared imaging device for detecting and measuring irradiances within a predetermined range of values in a laser beam comprising
    cholesteric liquid crystal means to enable visual observation of said irradiances;
    means for cooling said liquid crystal means to permit extended operation of the imaging device over high power average irradiances;
    means for preventing infrared radiation from passing from said liquid crystal means to said cooling means; and
    means for supporting and holding said liquid crystal means and said cooling means in a cooperating operative relationship.

2. A device as recited in claim 1 in which the cholesteric liquid crystal means comprises a layer of cholesteric liquid crystals applied to a supporting medium.

3. A device as recited in claim 2 in which the supporting medium comprises a sheet of mylar film.

4. A device as recited in claim 3 in which the mylar film's thickness is in the range of from 0.0005 to 0.005 inch.

5. A device as recited in claim 2 in which the cooling means comprises a reservoir of circulating cooling-water of sufficient volume so as to enable extended operation of the imaging device over relatively high power average irradiances, said reservoir having means for raising, lowering and maintaining the cooling-water at a desired temperature.

6. A device as recited in claim 5 in which the supporting and holding means comprises a housing segmented into plural compartments, the first of said compartments being capable of holding said water reservoir and another of said compartments being a cavity positioned between said supporting medium and said first compartment.

7. A device as recited in claim 6 further comprising means for maintaining a water pressure head in said cavity and means for causing a turbulance region to exist in said cavity adjacent to said supporting medium to expedite heat transfer from said liquid crystal layer and said supporting medium to said cooling-water circulating through said cavity.

8. A device as recited in claim 7 in which said water pressure head maintaining means and turbulance region causing means comprise a rotatable impellor positioned in said cavity.

9. A device as recited in claim 2 in which said infrared radiation prevention means comprises a reflective coating of aluminum affixed to the opposite surface of said supporting medium from that surface to which said layer of cholesteric liquid crystals is applied.

* * * * *